United States Patent
ElShenawy et al.

(10) Patent No.: US 11,548,442 B2
(45) Date of Patent: Jan. 10, 2023

(54) PASSENGER SAFEGUARDS FOR AUTONOMOUS VEHICLES

(71) Applicant: GM Cruise Holdings LLC, San Francisco, CA (US)

(72) Inventors: Mohamed Mostafa ElShenawy, Burlingame, CA (US); Nathan Mandi, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 316 days.

(21) Appl. No.: 16/872,903

(22) Filed: May 12, 2020

(65) Prior Publication Data
US 2021/0354625 A1 Nov. 18, 2021

(51) Int. Cl.
*B60Q 9/00* (2006.01)
*G05D 1/00* (2006.01)
*E05B 81/56* (2014.01)
*E05B 83/36* (2014.01)
*G01S 17/58* (2006.01)
*E05B 81/64* (2014.01)

(52) U.S. Cl.
CPC .............. *B60Q 9/008* (2013.01); *E05B 81/56* (2013.01); *E05B 81/64* (2013.01); *E05B 83/36* (2013.01); *G01S 17/58* (2013.01); *G05D 1/0088* (2013.01); *G05D 2201/0213* (2013.01)

(58) Field of Classification Search
CPC .......... B60Q 9/008; B60Q 9/00; B60Q 1/324; B60Q 1/525; B60Q 1/32; B60Q 1/2692; E05B 81/56; E05B 81/64; E05B 83/36; E05B 81/78; G01S 17/58; G01S 17/08; G01S 17/86; G01S 17/87; G01S 15/931; G01S 17/931; G05D 1/0088; G05D 2201/0213; B60R 21/0132; B60R 16/02; B60R 21/0134
See application file for complete search history.

(56) References Cited

U.S. PATENT DOCUMENTS

| | | | | |
|---|---|---|---|---|
| 5,760,708 | A * | 6/1998 | Seith ..................... | G08G 1/168 180/169 |
| 7,193,509 | B2 * | 3/2007 | Bartels ................. | B60Q 1/2665 340/436 |
| 9,637,965 | B1 * | 5/2017 | Kothari .................. | B60Q 1/324 |
| 9,725,038 | B2 * | 8/2017 | Wu ........................ | B60Q 9/008 |
| 9,845,048 | B1 * | 12/2017 | Tseng ...................... | B60Q 1/50 |
| 10,026,319 | B2 * | 7/2018 | Wu ........................ | B60Q 9/008 |
| 10,049,580 | B1 * | 8/2018 | Wu ........................ | B60Q 1/525 |
| 10,060,170 | B2 * | 8/2018 | Gómez Melchor .... | B60J 5/0493 |
| 10,086,833 | B1 * | 10/2018 | Duan .................... | G01S 15/931 |
| 10,183,640 | B2 * | 1/2019 | Rhode ................. | B60R 21/0134 |

(Continued)

*Primary Examiner* — Brian E Miller
(74) *Attorney, Agent, or Firm* — Polsinelli PC (57) ABSTRACT

Systems, methods, and computer-readable media are provided for detecting whether an object is approaching an autonomous vehicle when a passenger is about to exit the autonomous vehicle, determining a speed and type of the object that is approaching the autonomous vehicle, determining whether the object will enter an exit zone when the passenger enters the exit zone based on the speed and the type of the object that is approaching the autonomous vehicle, and preventing the passenger from exiting the autonomous vehicle based on the determining of whether the object will enter the exit zone when the passenger enters the exit zone.

20 Claims, 5 Drawing Sheets

(56) References Cited

U.S. PATENT DOCUMENTS

| | | | |
|---|---|---|---|
| 10,233,679 B1* | 3/2019 | Chan | E05B 77/54 |
| 10,435,920 B2* | 10/2019 | Ganeshan | B60Q 1/525 |
| 10,532,738 B2* | 1/2020 | Yoo | B60W 30/08 |
| 10,726,812 B2* | 7/2020 | Hélot | B60R 25/1004 |
| 10,754,021 B2* | 8/2020 | Baheti | G01S 13/536 |
| 11,214,194 B2* | 1/2022 | Thorngren | B60Q 1/324 |
| 2005/0168331 A1* | 8/2005 | Gunderson | B60Q 9/006 340/468 |
| 2005/0280518 A1* | 12/2005 | Bartels | G08G 1/166 340/691.3 |
| 2006/0056086 A1* | 3/2006 | Hannah | B60Q 1/2665 359/843 |
| 2008/0218381 A1* | 9/2008 | Buckley | B60Q 1/324 340/932.2 |
| 2008/0238636 A1* | 10/2008 | Birging | B60R 25/1004 340/933 |
| 2009/0322501 A1* | 12/2009 | Haberland | B60W 50/14 340/435 |
| 2013/0060429 A1* | 3/2013 | Kim | B60K 28/00 701/48 |
| 2013/0169425 A1* | 7/2013 | Victor | B60Q 5/006 340/435 |
| 2014/0098230 A1* | 4/2014 | Baur | B60Q 1/00 348/148 |
| 2014/0297173 A1* | 10/2014 | Li | G08G 1/056 701/301 |
| 2014/0309849 A1* | 10/2014 | Ricci | G06F 21/31 701/33.4 |
| 2014/0310186 A1* | 10/2014 | Ricci | A61B 5/742 705/302 |
| 2015/0330111 A1* | 11/2015 | Dente | E05B 81/14 701/49 |
| 2016/0023600 A1* | 1/2016 | Okamoto | B60Q 1/323 340/435 |
| 2016/0208537 A1* | 7/2016 | Senguttuvan | B60Q 1/324 |
| 2017/0021759 A1* | 1/2017 | Zhang | B60Q 1/324 |
| 2017/0169703 A1* | 6/2017 | Carrasco | B60Q 5/006 |
| 2017/0210282 A1* | 7/2017 | Rodriguez Barros | B60Q 9/002 |
| 2017/0218678 A1* | 8/2017 | Kothari | B60Q 1/324 |
| 2018/0001890 A1* | 1/2018 | Ratcliffe | B60W 50/14 |
| 2018/0081357 A1* | 3/2018 | Datta Gupta | G08G 1/163 |
| 2018/0233048 A1* | 8/2018 | Andersson | G08G 1/166 |
| 2019/0211587 A1* | 7/2019 | Ganeshan | E05B 77/14 |
| 2019/0259283 A1* | 8/2019 | Sung | B60Q 5/006 |
| 2021/0101529 A1* | 4/2021 | Thorngren | B60Q 9/008 |
| 2021/0180373 A1* | 6/2021 | Goriesky | B60Q 1/525 |
| 2021/0354625 A1* | 11/2021 | ElShenawy | E05B 83/36 |

* cited by examiner

PASSENGER SAFEGUARDS FOR AUTONOMOUS VEHICLES

BACKGROUND

1. Technical Field

The subject technology provides solutions for autonomous vehicles, and in particular, for securing passenger doors of the autonomous vehicle when an incoming object is detected.

2. Introduction

Autonomous vehicles are vehicles having computers and control systems that perform driving and navigation tasks conventionally performed by a human driver. As autonomous vehicle technologies continue to advance, ride-hailing services will increasingly utilize autonomous vehicles to improve service safety and efficiency. For effective use in ride-hailing deployments, autonomous vehicles will be required to execute many service functions that are conventionally performed by human drivers.

Autonomous vehicles can further utilize semantic maps to navigate across a particular terrain, when deployed. At the end of a deployment, passengers may exit the autonomous vehicle from one of its doors. However, unbeknownst to the passenger, a cyclist or vehicle may be approaching the autonomous vehicle at a high rate of speed, potentially striking the passenger upon exit of the autonomous vehicle.

As such, a need exists for a system and a method that can efficiently and effectively detect approaching objects, thereby providing a safe exit strategy for the passengers in the autonomous vehicle.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Figure 1:
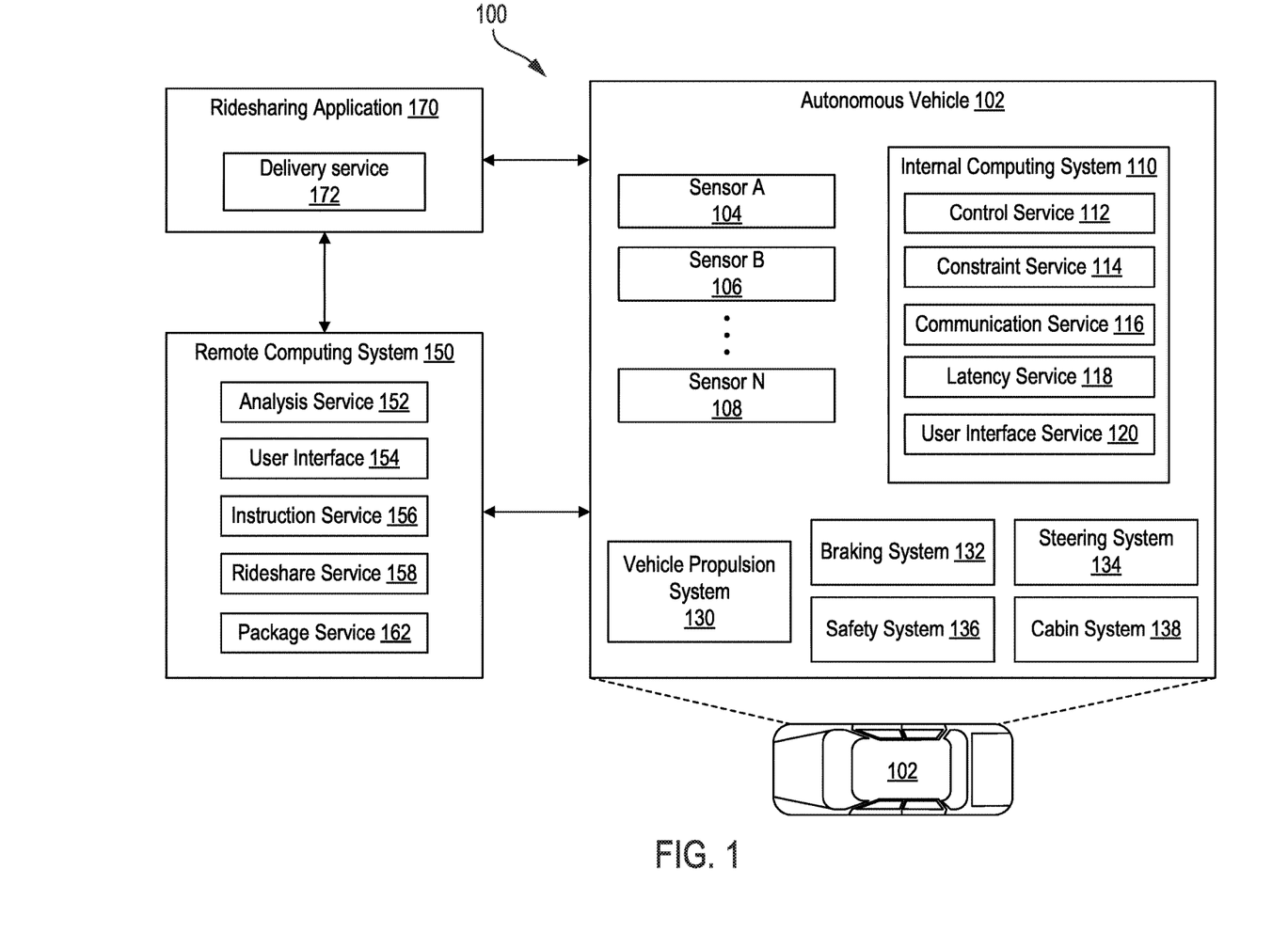
FIG. 1 illustrates an example environment that includes an autonomous vehicle in communication with a remote computing system, according to some aspects of the disclosed technology.

FIG. 1 illustrates an example autonomous vehicle environment 100. The example autonomous vehicle environment 100 includes an autonomous vehicle 102, a remote computing system 150, and a ridesharing application 170. The autonomous vehicle 102, remote computing system 150, and ridesharing application 170 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The sensors 104-108 on the autonomous vehicle 102 can include one or more types of sensors and can be arranged about the autonomous vehicle 102. For example, the sensors 104-108 can include, without limitation, one or more inertial measuring units (IMUs), one or more image sensors (e.g., visible light image sensors, infrared image sensors, video camera sensors, surround view camera sensors, etc.), one or more light emitting sensors, one or more global positioning system (GPS) devices, one or more radars, one or more light detection and ranging sensors (LIDARs), one or more sonars, one or more accelerometers, one or more gyroscopes, one or more magnetometers, one or more altimeters, one or more tilt sensors, one or more motion detection sensors, one or more light sensors, one or more audio sensors, etc. In some implementations, sensor 104 can be a radar, sensor 106 can be a first image sensor (e.g., a visible light camera), and sensor 108 can be a second image sensor (e.g., a thermal camera). Other implementations can include any other number and type of sensors.

The autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, etc.

The autonomous vehicle 102 can include an internal computing system 110 in communication with the sensors 104-108 and the systems 130, 132, 134, 136, and 138. The internal computing system 110 includes one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 130, the braking system 132, the steering system 134, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface that provides cellular (long-term evolution (LTE), 3rd Generation (3G), 5th Generation (5G), etc.) communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to the autonomous vehicle 102 regarding destinations, requested routes, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing devices, such as tablet computers, laptop computers, smartphones, head-mounted displays (HMDs), gaming systems, servers, smart devices, smart wearables, and/or any other computing devices. In some cases, such computing devices can be passenger computing devices. The rideshare service 158 can receive from passenger ridesharing app 170 requests, such as user requests to be picked up or dropped off, and can dispatch autonomous vehicle 102 for a requested trip.

The rideshare service 158 can also act as an intermediary between the ridesharing app 170 and the autonomous vehicle 102. For example, rideshare service 158 can receive from a passenger instructions for the autonomous vehicle 102, such as instructions to go around an obstacle, change routes, honk the horn, etc. The rideshare service 158 can provide such instructions to the autonomous vehicle 102 as requested.

The remote computing system 150 can also include a package service 162 configured to interact with the ridesharing application 170 and/or a delivery service 172 of the ridesharing application 170. A user operating ridesharing application 170 can interact with the delivery service 172 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 172 to provide a package identifier to the user for package labeling and tracking. Package delivery service 172 can also inform a user of where to bring their labeled package for drop off. In some examples, a user can request the autonomous vehicle 102 come to a specific location, such as the user's location, to pick up the package. While delivery service 172 has been shown as part of the ridesharing application 170, it will be appreciated by those of ordinary skill in the art that delivery service 172 can be its own separate application.

One beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Autonomous vehicles are vehicles having computers and control systems that perform driving and navigation tasks conventionally performed by a human driver. As autonomous vehicle technologies continue to advance, ride-hailing services will increasingly utilize autonomous vehicles to improve service safety and efficiency. For effective use in ride-hailing deployments, autonomous vehicles will be required to execute many service functions that are conventionally performed by human drivers.

Autonomous vehicles can further utilize semantic maps to navigate across a particular terrain, when deployed. At the end of a deployment, passengers may exit the autonomous vehicle from one of its doors. However, unbeknownst to the passenger, a cyclist or vehicle may be approaching the autonomous vehicle at a high rate of speed, potentially striking the passenger upon exit of the autonomous vehicle.

As such, a need exists for a system and a method that can efficiently and effectively detect approaching objects, thereby providing a safe exit strategy for the passengers in the autonomous vehicle.

Figure 2:
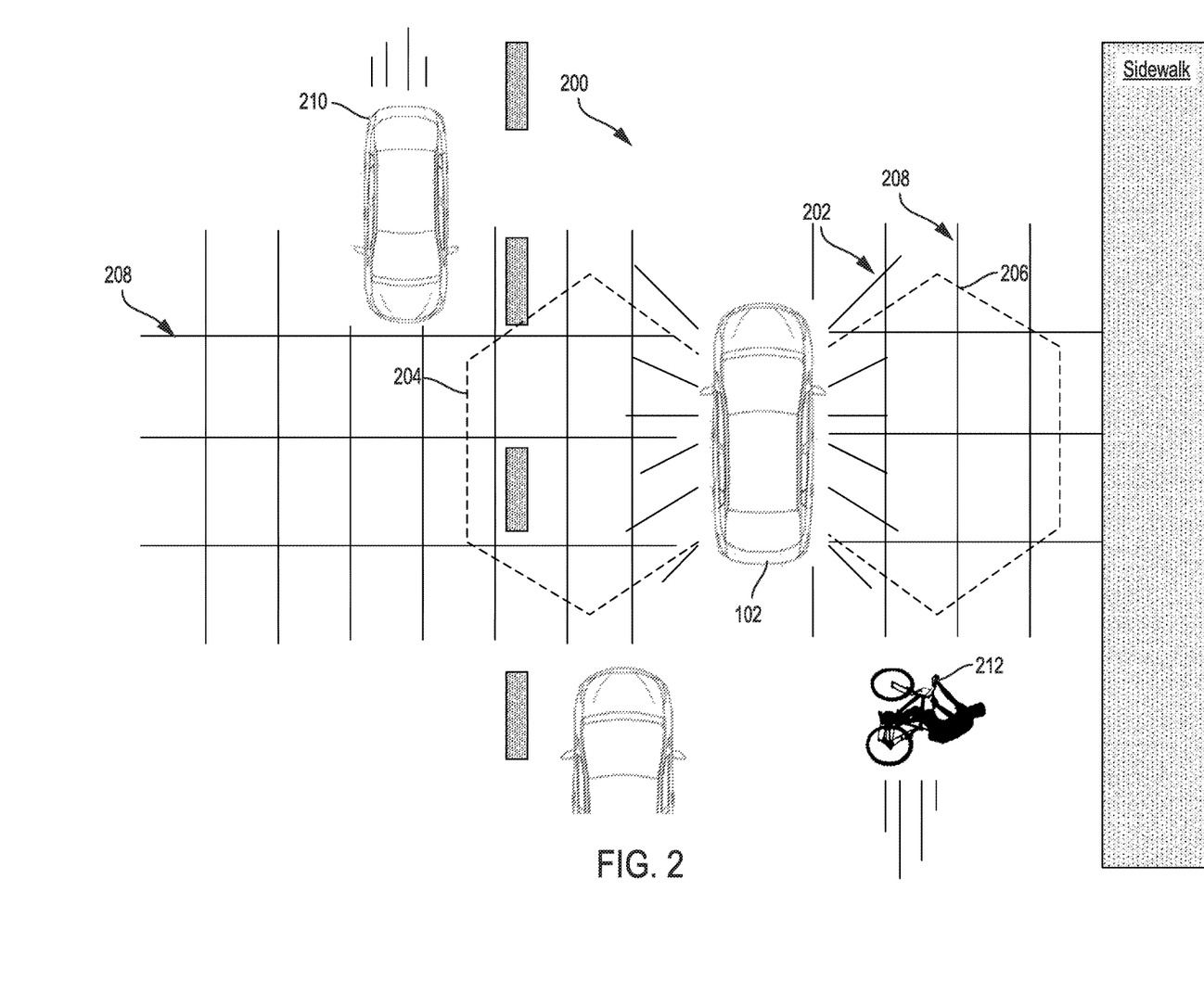
FIG. 2 illustrates an example object approaching detection system, according to some aspects of the disclosed technology.

FIG. 2 illustrates an example object approaching detection system 200, according to some aspects of the disclosed technology. In some instances, the object approaching detection system 200 can provide a passenger safety system that can secure passengers within an autonomous vehicle 102 upon detection of an approaching object 210, 212 that may enter an exit zone 204, 206 of the exiting passenger.

In some instances, the object approaching detection system 200 may warn the passenger of an oncoming object and/or lock the passenger doors to prohibit the passenger from exiting the autonomous vehicle 102 if the object approaching detection system 200 determines that the approaching object 210, 212 may enter the exit zones 204, 206 when the passenger is also within the exit zones 204, 206.

An autonomous vehicle 102 is a motorized vehicle that can navigate without a human driver. Autonomous vehicle navigation can be dependent on the ability of the autonomous vehicle 102 to detect and make sense of its surrounding environment. In some implementations, these navigation functions can be performed by the autonomous vehicle 102 using labeled images of an environment through which the autonomous vehicle 102 is navigating. For example, properly labeled images indicating drivable surfaces (e.g., roadways, intersections, crosswalks, and on-ramps, etc.) can utilized by the autonomous vehicle 102 to make navigation and planning decisions.

In some instances, top-down (2D) images of roadways or other drivable surfaces can be labeled, wherein geometric boundaries 208 (e.g., polygons) can be placed around items of interest (e.g., roadways, crosswalks, or intersections, etc.), and one can also associate a semantic label with these geometric shapes. By way of example, in labeling an image of a four-way intersection, a labeler may draw bounding boxes around the four crosswalks and indicate a semantic label with each. In some instances, each bounding box may be tagged to correspond with the label "crosswalk," or another label that uniquely identifies that particular crosswalk and its associated bounding box. In other instances, a bounding box can be placed around the approaching objects 210, 212 and a semantic label associated with each of the approaching objects 210, 212.

Sensors:

The autonomous vehicle 102 of the object approaching detection system 200 can include various sensors 202 to detect the approach of the object 210, 212, such as camera sensors, light detection and ranging (LIDAR) sensors, radio detection and ranging (RADAR) sensors, and any other sensor suitable for the intended purpose and understood by a person of ordinary skill in the art. The sensors 202 collect data and measurements that the autonomous vehicle 102 can use for operations such as navigation and automotive controls. The sensors 202 can provide the data and measurements to an internal computing system of the autonomous vehicle 102, which can use the data and measurements to control a mechanical system of the autonomous vehicle 102, such as a vehicle propulsion system, a braking system, a door lock system, or a steering system. Furthermore, the sensors 202 can be mounted at fixed locations on the autonomous vehicle 102 to provide optimum views of the surrounding area.

In some instances, the sensors 202 of the object approaching detection system 200 can determine the speed, trajectory, distance, position, size, or any other parameter of the approaching object 210, 212 suitable for the intended purpose and understood by a person of ordinary skill in the art. For example, as the object 210, 212 approaches the autonomous vehicle 102, the sensors 202 can determine the path of travel and speed of the object 210, 212 to ascertain whether (e.g., when and where) the approaching object 210, 212 may enter the exit zone 204, 206.

Approaching Object:

In some instances, the approaching object 210, 212 can be a vehicle, a cyclist, a pedestrian, a scooterist, a motorcycle, a skateboarder, a roller skater, or any other object suitable for intended purpose and understood by a person of ordinary skill in the art.

There may be instances where a passenger is about to exit the autonomous vehicle 102 while the object 210, 212 is approaching the autonomous vehicle 102 at a high rate of speed. However, the approaching object 210, 212 may be some distance away from the autonomous vehicle 102 and may not be visible to the passenger inside of the autonomous vehicle 102. In this instance, if no safety feature was available, the passenger may exit the autonomous vehicle 102 at the drop-off site and potentially be struck by the approaching object 210, 212, causing possible serious injury. As described herein, the object approaching detection system 200 may prevent such an injury by preventing or warning the passenger of a potential collision with the approaching object 210, 212.

Exit Zone:

In some instances, the exit zone 204, 206 of the object approaching detection system 200 can include areas around the autonomous vehicle 102 that the passenger may potentially occupy upon exiting the autonomous vehicle 102. For example, as shown in FIG. 2, exit zone 204 is the area to the left of the autonomous vehicle 102 (e.g., towards oncoming traffic), while exit zone 206 is the area to the right of the autonomous vehicle 102 (e.g., towards the sidewalk). The shape of the exit zones 204, 206 can be a square, rectangle, circle, or any other polygonal shape suitable for the intended purpose and understood by a person of ordinary skill in the art.

The exit zone 204, 206 can be the area in which the passenger is next to the autonomous vehicle 102 upon exit. For example, firstly, the passenger opens a door of the autonomous vehicle 102, and then the passenger proceeds to exit the autonomous vehicle 102. Thereafter, the passenger can close the door and begin walking away from the autonomous vehicle 102 until the passenger reaches a safe distance from the autonomous vehicle 102 (e.g., the sidewalk). During this whole time, the area in which the passenger can reside, may be considered the exit zone 204, 206.

In some instances, the area or size of the exit zones 204, 206 may be change dynamically. For example, the object approaching detection system 200 can detect that children are about to exit the autonomous vehicle 102. Upon detection of children, the object approaching detection system 200 may expand the area of the exit zones 204, 206 because there is the possibility that children will jump out of the autonomous vehicle 102 and begin running.

In other instances, the object approaching detection system 200 can change the size of the exit zones 204, 206 based on the type, size, and/or speed of the object 210, 212 approaching the autonomous vehicle 102. For example, the size of the exit zones 204, 206 for a jogging pedestrian may be smaller than if the approaching object was a motorcycle traveling at 45 MPH. In each instance, if the object approaching detection system 200 determines that the object 210, 212 may enter the exit zones 204, 206 when the passenger is also within the exit zones 204, 206, then the object approaching detection system 200 can warn the passenger of an oncoming object and/or lock the passenger doors to prohibit the passenger from exiting the autonomous vehicle 102.

In some instances, the exit zones 204, 206 of the object approaching detection system 200 may vary in size independent from one another. For example, if the object 210 is a vehicle, the exit zone 204 may be a relatively large-sized exit zone. If the object 212 is a leisurely strolling cyclist, the exit zone 206 may be a relatively small-sized exit zone. The shape of the exit zones 204, 206 may also be square, rectangular, circular, cylindrical, polygonal, or any other shape suitable for the intended purpose and understood by a person of ordinary skill in the art.

Exit Strategy:

As discussed above, in some instances, the object approaching detection system 200 may warn the passenger of an oncoming object and/or lock the passenger doors to prohibit the passenger from exiting the autonomous vehicle 102 if the object approaching detection system 200 determines that the approaching object 210, 212 will enter the exit zones 204, 206 when the passenger is also within the exit zones 204, 206.

In other instances, the object approaching detection system 200 can warn the passenger with an audio or visual warning. For example, the object approaching detection system 200 can blare a siren or begin flashing lights of different colors. The object approaching detection system 200 can also provide a written display or audio readout of a warning message, such as "oncoming object, do not exit the vehicle."

In some instances, the object approaching detection system 200 can initiate determining whether an object 210, 212 may enter the exit zones 204, 206 when the object approaching detection system 200 determines that a passenger may exit the autonomous vehicle 102. For example, if the drop-off point is known, the object approaching detection system 200 may begin determining whether an object 210, 212 may enter the exit zones 204, 206 when the autonomous vehicle 102 nears the drop-off point. In another example, if the object approaching detection system 200 detects that the passenger is approaching one of the passenger doors to exit, the object approaching detection system 200 may begin determining whether an object 210, 212 may enter the exit zones 204, 206. In some instances, the object approaching detection system 200 can detect which passenger door the passenger intends to exit (e.g., the path of travel of the passenger is directed to a single passenger door), thereby initiating the determining of whether the object 210, 212 may enter the corresponding exit zones 204, 206.

In other instances, after the object approaching detection system 200 detects that an object 210, 212 may enter the exit zones 204, 206 and warns the passenger, the passenger may yet try to open the passenger door. In this instance, the object approaching detection system 200 may detect that the passenger is attempting to open the passenger door and may lock the passenger doors for the safety of the passenger (e.g., the passenger is unable to hear the audio warning or a blind passenger is unable to see a flashing warning). In other instances, the object approaching detection system 200 can lock the passenger doors of the autonomous vehicle 102 regardless of whether a passenger is detected as attempting to open the passenger doors, as there may be false negatives in detecting the passenger will attempt to open the door by the object approaching detection system 200.

In some instances, if the object approaching detection system 200 determines that the approaching object 210, 212 may not enter the exit zones 204, 206, the object approaching detection system 200 may not warn the passenger or lock the passenger doors of the autonomous vehicle 102.

In other instances, if the passenger fails to exit the autonomous vehicle 102 at the prescribed time (e.g., the passenger is looking at their phone), the object approaching detection system 200 may continuously monitor the surrounding area for approaching objects 210, 212 that may enter the exit zones 204, 206 in case the passenger decides to exit the autonomous vehicle 102. In some instances, the object approaching detection system 200 may relock the passenger doors if the passenger fails to exit the autonomous vehicle 102 after a predetermined period of time.

In some instances, if the object approaching detection system 200 determines that one side of the autonomous vehicle 102 may have an object 210, 212 within one of the exit zones 204, 206 of an extended period of time (e.g., a large group of cyclists), the object approaching detection system 200 can signal to the passenger to use the other passenger door (e.g., an audio recording or visual message stating "please use the other door").

Figure 3:
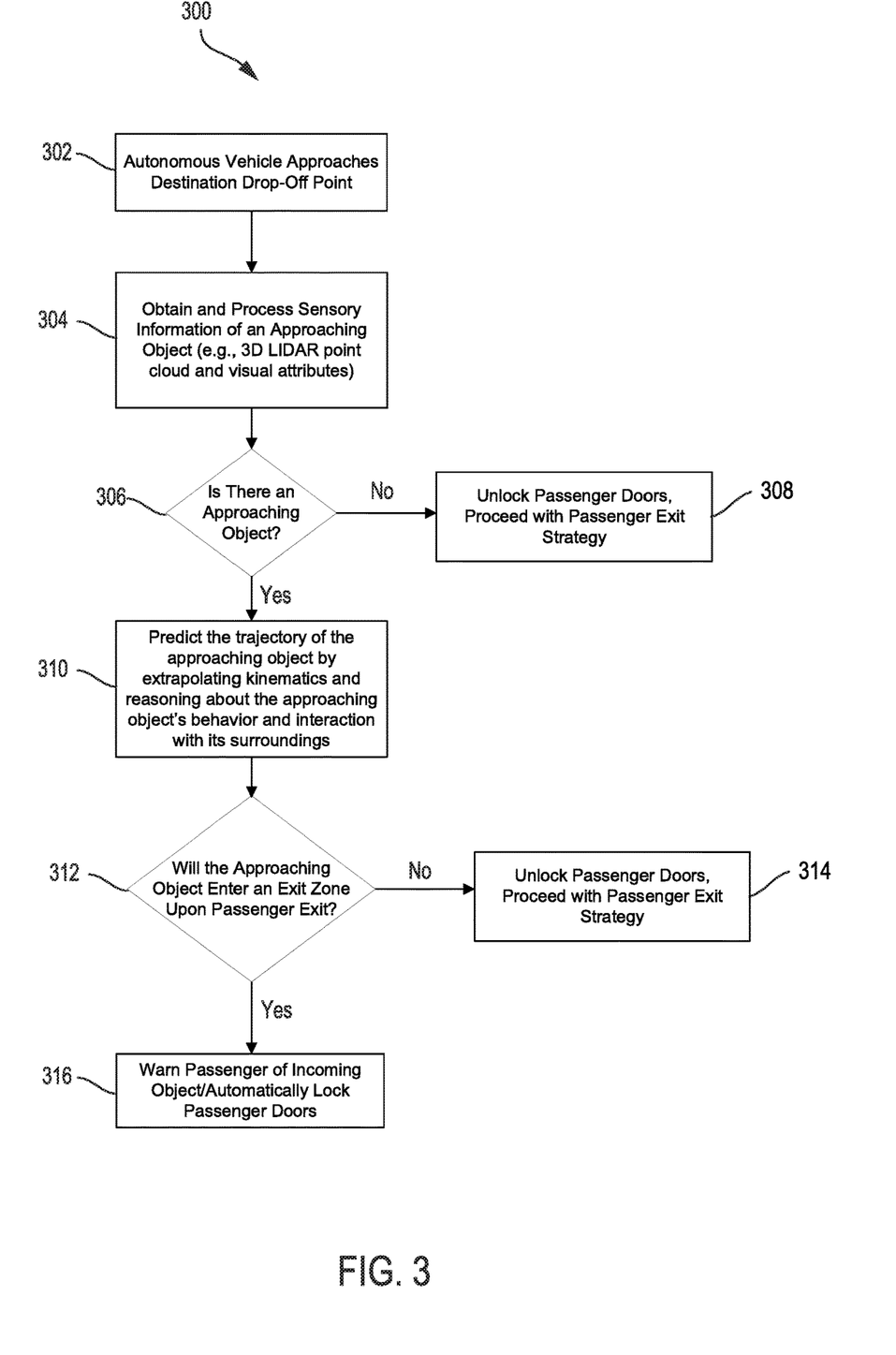
FIG. 3 illustrates an example flow chart of an approaching object detection process, according to some aspects of the disclosed technology.

FIG. 3 illustrates an example flow chart of an approaching object detection process 300, according to some aspects of the disclosed technology.

In some instances, the approaching object detection process 300 can include the autonomous vehicle approaching a destination drop-off point 302.

There may be instances where a passenger is about to exit the autonomous vehicle while an object is approaching the autonomous vehicle at a high speed. However, the approaching object may be some distance away from the autonomous vehicle and may not be visible to the passenger inside of the autonomous vehicle. In this instance, if no safety feature was available, the passenger may exit the autonomous vehicle at the drop-off site and potentially be struck by the approaching object, causing possible serious injury. As described herein, the approaching object detection process 300 may prevent such an injury by preventing or warning the passenger of a potential collision with the approaching object.

In some instances, the approaching object detection process 300 can include obtaining and processing sensory information of an approaching object 304. The autonomous vehicle of the approaching object detection process 300 can include various sensors to detect the approach of the object such as camera sensors, light detection and ranging (LIDAR) sensors, radio detection and ranging (RADAR) sensors, and any other sensor suitable for the intended purpose and understood by a person of ordinary skill in the art. The sensors can collect data and measurements that the autonomous vehicle can use for operations such as navigation and automotive controls. The sensors can provide the data and measurements to an internal computing system of the autonomous vehicle, which can use the data and measurements to control a mechanical system of the autonomous vehicle, such as a vehicle propulsion system, a braking system, a door lock system, or a steering system. Furthermore, the sensors can be mounted at fixed locations on the autonomous vehicle to provide optimum views of the surrounding area.

In some instances, the approaching object detection process 300 can also include determining whether an object is approaching the autonomous vehicle 306.

If the approaching object detection process 300 determines that there is no object approaching the autonomous vehicle, the approaching object detection process 300 can include unlocking the passenger doors of the autonomous vehicle and proceeding with a passenger exit strategy 308.

If the approaching object detection process 300 determines that there is an object approaching the autonomous vehicle, the approach object detection process 300 can include predicting the trajectory of the object approaching the autonomous vehicle by extrapolating the kinematics and reasoning about the object's behavior and interaction with its surroundings 310.

In some instances, the sensors of the approaching object detection process 300 can determine the speed, trajectory, distance, position, size, or any other parameter of the approaching object suitable for the intended purpose and understood by a person of ordinary skill in the art. For example, as the object approaches the autonomous vehicle, the sensors can determine the path of travel and speed of the object to ascertain whether (and if so, when and where) the approaching object may enter an exit zone.

In other instances, the approaching object detection process 300 can include determining whether the approaching object may enter an exit zone upon passenger exit 312. The exit zone of the approaching object detection process 300 can include areas around the autonomous vehicle that the passenger may potentially occupy upon exiting the autonomous vehicle.

The exit zone can also be the area in which the passenger is next to the autonomous vehicle upon exit. For example, firstly, the passenger opens a door of the autonomous vehicle, and then the passenger proceeds to exit the autonomous vehicle. Thereafter, the passenger can close the door and begin walking away from the autonomous vehicle until the passenger reaches a safe distance from the autonomous vehicle (e.g., the sidewalk). During this whole time, the area in which the passenger can reside, may be considered the exit zone.

In some instances, the area or size of the exit zones may be change dynamically. For example, the approaching object detection process 300 can detect that children are about to exit the autonomous vehicle. Upon detection of children, the object approaching detection system may expand the area of the exit zones because there is the possibility that children will jump out of the autonomous vehicle and begin running.

In other instances, the approaching object detection process 300 can change the size of the exit zones based on the type, size, and/or speed of the object approaching the autonomous vehicle. In some instances, the exit zones of the approaching object detection process 300 may vary in size independent from one another. The shape of the exit zones may also be square, rectangular, circular, cylindrical, polygonal, or any other shape suitable for the intended purpose and understood by a person of ordinary skill in the art.

If the approaching object detection process 300 determines that the approaching object will not enter the exit zone upon passenger exit, the approaching object detection process 300 can include unlocking the passenger doors of the autonomous vehicle and proceeding with a passenger exit strategy 314.

If the approaching object detection process 300 determines that the approaching object will enter the exit zone upon passenger exit, the approaching object detection process 300 can include warning the passenger of an incoming object and/or automatically lock the passenger doors to prevent the passenger from exiting the autonomous vehicle 316.

In other instances, the approaching object detection process 300 can warn the passenger with an audio or visual warning. For example, the approaching object detection process 300 can sound an alarm or begin flashing lights of different colors. The approaching object detection process 300 can also provide a written display or audio readout of a warning message, such as "oncoming object, do not exit the vehicle."

In some instances, the approaching object detection process 300 can initiate determining whether an object may enter the exit zones when the approaching object detection process 300 determines that a passenger may exit the autonomous vehicle. For example, if the drop-off point is known, the approaching object detection process 300 may begin determining whether an object may enter the exit zones when the autonomous vehicle nears the drop-off point. In other instances, the approaching object detection process 300 can detect which passenger door the passenger intends to exit (e.g., the path of travel of the passenger is directed to a single passenger door), thereby initiating the determining of whether the object may enter the corresponding exit zones.

In other instances, if the passenger fails to exit the autonomous vehicle at the prescribed time (e.g., the passenger is looking at their phone), the approaching object detection process 300 may continuously monitor the surrounding area for approaching objects that may enter the exit zones in case the passenger decides to exit the autonomous vehicle. In some instances, the approaching object detection process 300 may relock the passenger doors if the passenger fails to exit the autonomous vehicle after a predetermined period of time.

Figure 4:
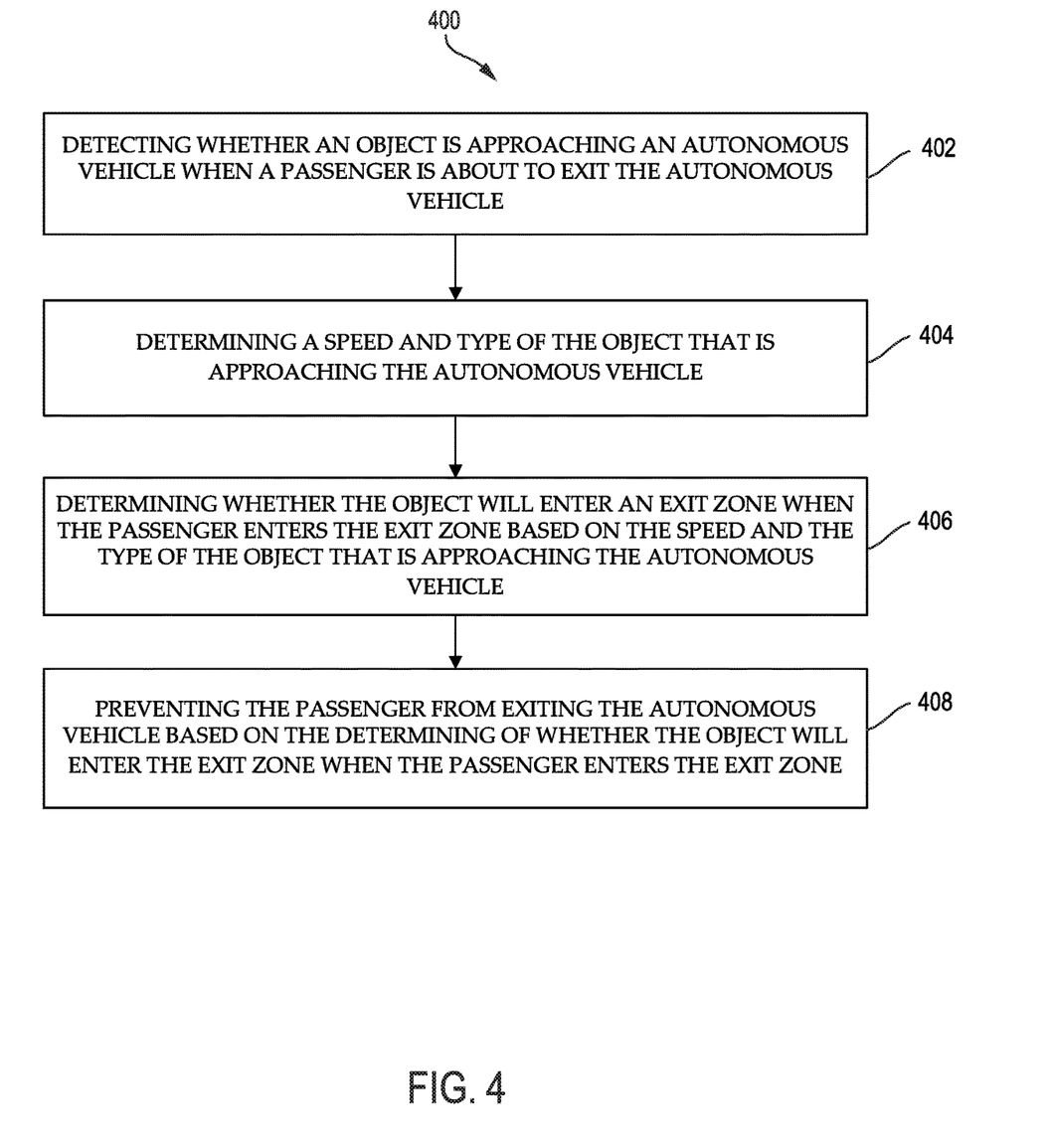
FIG. 4 illustrates an example process for safely prohibiting passenger exits based on detected approaching objects, according to some aspects of the disclosed technology.

Having disclosed some example system components and concepts, the disclosure now turns to FIG. 4, which illustrate example method 400 for safely prohibiting passenger exits based on detected approaching objects. The steps outlined herein are exemplary and can be implemented in any combination thereof, including combinations that exclude, add, or modify certain steps.

At step 402, the method 400 can include detecting whether an object is approaching an autonomous vehicle when a passenger is about to exit the autonomous vehicle.

There may be instances where a passenger is about to exit the autonomous vehicle while an object is approaching the autonomous vehicle at a high rate of speed. However, the approaching object may be some distance away from the autonomous vehicle and may not be visible to the passenger inside of the autonomous vehicle. In this instance, if no safety feature was available, the passenger may exit the autonomous vehicle at the drop-off site and potentially be struck by the approaching object, causing possible serious injury. As described herein, the method 400 may prevent such an injury by preventing or warning the passenger of a potential collision with the approaching object.

The autonomous vehicle of the method 400 can include various sensors to detect the approach of the object such as camera sensors, light detection and ranging (LIDAR) sensors, radio detection and ranging (RADAR) sensors, and any other sensor suitable for the intended purpose and understood by a person of ordinary skill in the art. The sensors can collect data and measurements that the autonomous vehicle can use for operations such as navigation and automotive controls. The sensors can provide the data and measurements to an internal computing system of the autonomous vehicle, which can use the data and measurements to control a mechanical system of the autonomous vehicle, such as a vehicle propulsion system, a braking system, a door lock system, or a steering system.

At step 404, the method 400 can include determining a speed and type of the object that is approaching the autonomous vehicle. In some instances, the type of the object can be one of a vehicle, a cyclist, a scooterist, and a pedestrian.

The sensors of the method 400 can determine the speed, trajectory, distance, position, size, or any other parameter of the approaching object suitable for the intended purpose and understood by a person of ordinary skill in the art. For example, as the object approaches the autonomous vehicle, the sensors can determine the path of travel and speed of the object to ascertain whether (e.g., when and where) the approaching object may enter an exit zone.

At step 406, the method 400 can include determining whether the object will enter an exit zone when the passenger enters the exit zone based on the speed and the type of the object that is approaching the autonomous vehicle.

In some instances, a size and shape of the exit zone can be based on the speed, the type, and a direction of the object that is approaching the autonomous vehicle. In other instances, the exit zone of the method 400 can include areas around the autonomous vehicle that the passenger may potentially occupy upon exiting the autonomous vehicle.

For example, the exit zone can be the area in which the passenger is next to the autonomous vehicle upon exit. Firstly, the passenger opens a door of the autonomous vehicle, and then the passenger proceeds to exit the autonomous vehicle. Thereafter, the passenger can close the door and begin walking away from the autonomous vehicle until the passenger reaches a safe distance from the autonomous vehicle (e.g., the sidewalk). During this whole time, the area in which the passenger can reside, may be considered the exit zone.

In some instances, the area or size of the exit zones may be change dynamically. For example, the method 400 can detect that children are about to exit the autonomous vehicle. Upon detection of children, the object approaching detection system may expand the area of the exit zones because there is the possibility that children will jump out of the autonomous vehicle and begin running.

In other instances, the method 400 can change the size of the exit zones based on the type, size, and/or speed of the object approaching the autonomous vehicle. In some instances, the exit zones of the method 400 may vary in size independent from one another. The shape of the exit zones may also be square, rectangular, circular, cylindrical, polygonal, or any other shape suitable for the intended purpose and understood by a person of ordinary skill in the art.

At step 408, the method 400 can include preventing the passenger from exiting the autonomous vehicle based on the determining of whether the object will enter the exit zone when the passenger enters the exit zone.

In some instances, the preventing of the passenger from exiting the autonomous vehicle can include at least one of locking passenger doors of the autonomous vehicle, displaying a visual warning message, and blaring an audible warning message.

In some instances, the method 400 can further include initiating the detecting of whether the object is approaching the autonomous vehicle when the auto autonomous vehicle nears a designated drop-off point. For example, the method 400 can initiate determining whether an object may enter the exit zones when the method 400 determines that a passenger may exit the autonomous vehicle. For example, if the drop-off point is known, the method 400 may begin determining whether an object may enter the exit zones when the autonomous vehicle nears the drop-off point. In other instances, the method 400 can detect which passenger door the passenger intends to exit (e.g., the path of travel of the passenger is directed to a single passenger door), thereby initiating the determining of whether the object may enter the corresponding exit zones.

In other instances, the method 400 can further include continuously monitoring for subsequent approaching objects after determining that the object will not enter the exit zone and while awaiting for the passenger to exit the autonomous vehicle. For example, if the passenger fails to exit the autonomous vehicle at the prescribed time (e.g., the passenger is looking at their phone), the method 400 may continuously monitor the surrounding area for approaching objects that may enter the exit zones in case the passenger decides to exit the autonomous vehicle. In some instances, the method 400 may relock the passenger doors if the passenger fails to exit the autonomous vehicle after a predetermined period of time.

Figure 5:
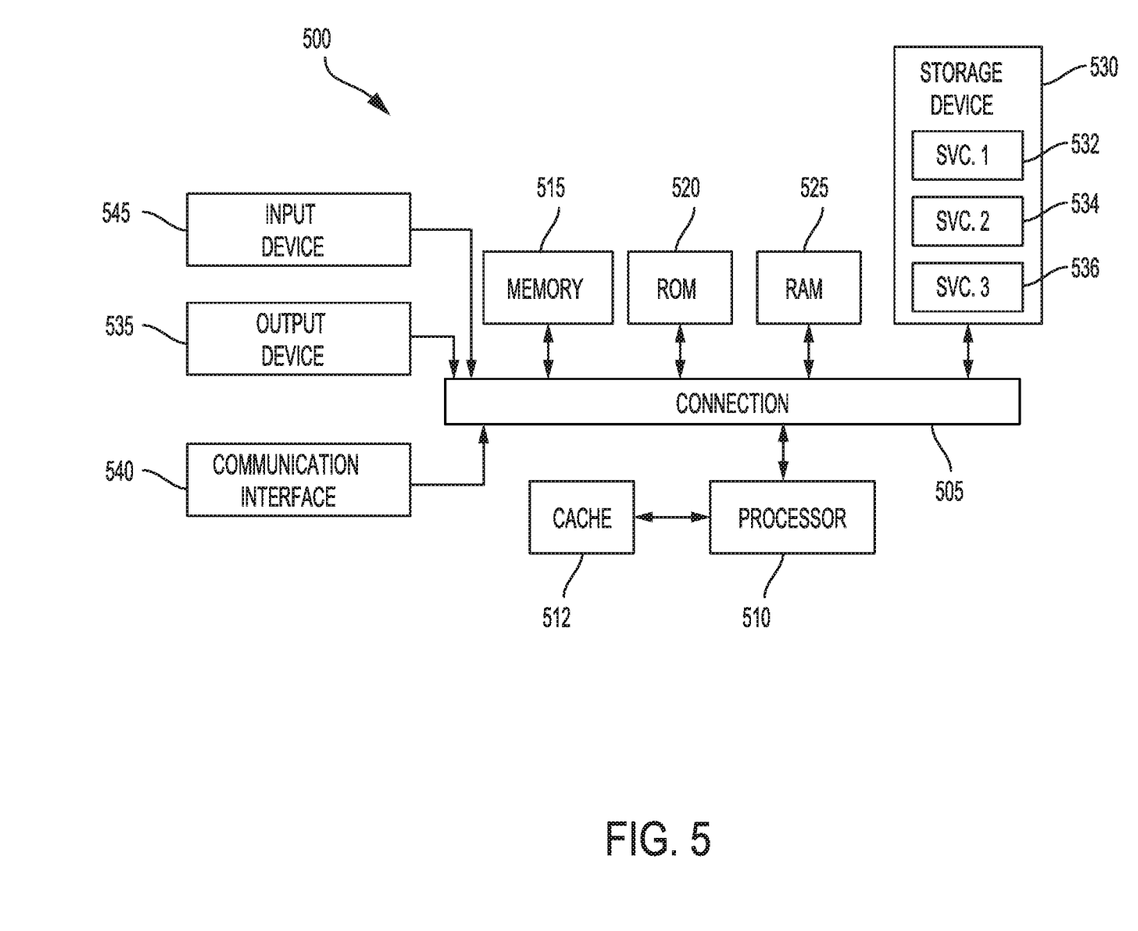
FIG. 5 illustrates an example processor-based system with which some aspects of the subject technology can be implemented.

FIG. 5 illustrates an example computing system 500 which can be, for example, any computing device making up internal computing system 110, remote computing system 150, a passenger device executing rideshare application 170, or any other computing device. In FIG. 5, the components of the computing system 500 are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method comprising:
   detecting whether an object is approaching an autonomous vehicle when a passenger is about to exit the autonomous vehicle;
   determining a speed and type of the object that is approaching the autonomous vehicle;
   determining whether the object will enter an exit zone when the passenger enters the exit zone based on the speed and the type of the object that is approaching the autonomous vehicle; detecting that the passenger is a child;
   detecting that the child is about to exit the autonomous vehicle;
   expanding the exit zone based on detection of the child; and
   preventing the passenger from exiting the autonomous vehicle based on the determining of whether the object will enter the exit zone when the passenger enters the exit zone.

2. The computer-implemented method of claim 1, further comprising initiating the detecting of whether the object is approaching the autonomous vehicle when the auto autonomous vehicle nears a designated drop-off point.

3. The computer-implemented method of claim 1, wherein the detecting of whether the object is approaching the autonomous vehicle is detected with a light detection and ranging sensor.

4. The computer-implemented method of claim 1, wherein the type of the object is one of a vehicle, a cyclist, a scooterist, and a pedestrian.

5. The computer-implemented method of claim 1, wherein a size and shape of the exit zone is based on the speed, the type, and a direction of the object that is approaching the autonomous vehicle.

6. The computer-implemented method of claim 1, wherein the preventing of the passenger from exiting the autonomous vehicle includes at least one of locking passenger doors of the autonomous vehicle, displaying a visual warning message, and blaring an audible warning message.

7. The computer-implemented method of claim 1, further comprising continuously monitoring for subsequent approaching objects after determining that the object will not enter the exit zone and while awaiting for the passenger to exit the autonomous vehicle.

8. A system comprising:
   one or more processors; and
   at least one computer-readable storage medium having stored therein instructions which, when executed by the one or more processors, cause the system to:
   detect whether an object is approaching an autonomous vehicle when a passenger is about to exit the autonomous vehicle;
   determine a speed and type of the object that is approaching the autonomous vehicle;
   determine whether the object will enter an exit zone when the passenger enters the exit zone based on the speed and the type of the object that is approaching the autonomous vehicle; detect that the passenger is a child;
   detect that the child is about to exit the autonomous vehicle;
   expand the exit zone based on detection of the child; and
   prevent the passenger from exiting the autonomous vehicle based on the determination of whether the object will enter the exit zone when the passenger enters the exit zone.

9. The system of claim 8, wherein the instructions which, when executed by the one or more processors, cause the system to initiate the detection of whether the object is approaching the autonomous vehicle when the auto autonomous vehicle nears a designated drop-off point.

10. The system of claim 8, wherein the detection of whether the object is approaching the autonomous vehicle is detected with a light detection and ranging sensor.

11. The system of claim 8, wherein the type of the object is one of a vehicle, a cyclist, a scooterist, and a pedestrian.

12. The system of claim 8, wherein a size and shape of the exit zone is based on the speed, the type, and a direction of the object that is approaching the autonomous vehicle.

13. The system of claim 8, wherein the prevention of the passenger from exiting the autonomous vehicle includes at least one of locking passenger doors of the autonomous vehicle, displaying a visual warning message, and blaring an audible warning message.

14. The system of claim 8, wherein the instructions which, when executed by the one or more processors, cause the system to continuously monitor for subsequent approaching objects after determining that the object will not enter the exit zone and while awaiting for the passenger to exit the autonomous vehicle.

15. A non-transitory computer-readable storage medium comprising:
   instructions stored on the non-transitory computer-readable storage medium, the instructions, when executed by one more processors, cause the one or more processors to:
   detect whether an object is approaching an autonomous vehicle when a passenger is about to exit the autonomous vehicle;
   determine a speed and type of the object that is approaching the autonomous vehicle;
   determine whether the object will enter an exit zone when the passenger enters the exit zone based on the speed and the type of the object that is approaching the autonomous vehicle; detect that the passenger is a child;
   detect that the child is about to exit the autonomous vehicle;
   expand the exit zone based on detection of the child; and
   prevent the passenger from exiting the autonomous vehicle based on the determination of whether the object will enter the exit zone when the passenger enters the exit zone.

16. The non-transitory computer-readable storage medium of claim 15, wherein the instructions, when executed by one more processors, cause the one or more processors to initiate the detection of whether the object is approaching the autonomous vehicle when the auto autonomous vehicle nears a designated drop-off point.

17. The non-transitory computer-readable storage medium of claim 15, wherein the detection of whether the object is approaching the autonomous vehicle is detected with a light detection and ranging sensor.

18. The non-transitory computer-readable storage medium of claim 15, wherein the type of the object is one of a vehicle, a cyclist, a scooterist, and a pedestrian.

19. The non-transitory computer-readable storage medium of claim 15, wherein a size and shape of the exit zone is based on the speed, the type, and a direction of the object that is approaching the autonomous vehicle.

20. The non-transitory computer-readable storage medium of claim 15, wherein the preventing of the passenger from exiting the autonomous vehicle includes at least one of locking passenger doors of the autonomous vehicle, displaying a visual warning message, and blaring an audible warning message.

\* \* \* \* \*